＃US009949080B2

United States Patent
Calvarese et al.

(10) Patent No.: US 9,949,080 B2
(45) Date of Patent: Apr. 17, 2018

(54) ARRANGEMENT FOR, AND METHOD OF, FINDING AND RECOVERING LOST MOBILE DEVICES IN A VENUE

(71) Applicant: SYMBOL TECHNOLOGIES, LLC, Lincolnshire, IL (US)

(72) Inventors: Russell E. Calvarese, Stony Brook, NY (US); Richard J. Lavery, Huntington, NY (US); Charles Lauria, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/171,109

(22) Filed: Jun. 2, 2016

(65) Prior Publication Data
US 2017/0353832 A1 Dec. 7, 2017

(51) Int. Cl.
*H04W 4/02* (2009.01)
*H04W 4/00* (2009.01)

(52) U.S. Cl.
CPC .......... *H04W 4/023* (2013.01); *H04W 4/008* (2013.01); *H04W 4/028* (2013.01)

(58) Field of Classification Search
CPC ...... H04W 4/023; H04W 4/008; H04W 4/028
See application file for complete search history.

(56) References Cited

U.S. PATENT DOCUMENTS

| 8,942,719 | B1* | 1/2015 | Hyde | G01S 5/0231 455/411 |
|---|---|---|---|---|
| 8,990,043 | B1* | 3/2015 | Kolodziej | G01C 5/06 455/404.2 |
| 2011/0039522 | A1* | 2/2011 | Partridge | G01S 19/45 455/414.1 |
| 2011/0210843 | A1* | 9/2011 | Kummetz | G01S 5/0289 340/517 |
| 2012/0127976 | A1* | 5/2012 | Lin | G01S 13/82 370/338 |
| 2014/0179344 | A1* | 6/2014 | Bansal | H04W 4/025 455/456.1 |
| 2014/0327518 | A1* | 11/2014 | Loutit | G06Q 10/08 340/7.58 |
| 2015/0269818 | A1* | 9/2015 | Jain | G08B 13/248 340/572.1 |
| 2015/0341602 | A1* | 11/2015 | Sabato | G06T 7/246 348/143 |
| 2016/0105767 | A1* | 4/2016 | Li | H04W 4/02 455/456.1 |
| 2017/0032162 | A1* | 2/2017 | Calvarese | G06K 7/10386 |

OTHER PUBLICATIONS

Wallen, "Remotely control your Android via Internet or SMS with Android Lost", TechRepublic, pp. 1-12; Nov. 7, 2014. [Retrieved on Mar. 8, 2017—http://www.techrepublic.com/article/remotely-control-your-android-via-internet-or-sms-with-android-lost/].

* cited by examiner

*Primary Examiner* — Brandon J Miller
(74) *Attorney, Agent, or Firm* — Yuri Astvatsaturov (57) ABSTRACT

A mobile device can be found and recovered by executing a recovery action indicative of at least one location of the mobile device. An interface displays the location of the mobile device.

18 Claims, 6 Drawing Sheets

ARRANGEMENT FOR, AND METHOD OF,
FINDING AND RECOVERING LOST
MOBILE DEVICES IN A VENUE

BACKGROUND OF THE INVENTION

The present disclosure relates generally to an arrangement for, and a method of, finding and recovering an electrically-powered, mobile device, such as a portable data capture device, that is missing and presumed to be lost in a venue, such as a retail store.

Many different types of electrically-powered, mobile devices, such as handheld data capture readers, smartphones, tablets, computers, smartwatches, or like electronic devices, are held or worn, and operated, by human operators in various venues, such as retail stores, factories, warehouses, distribution centers, buildings, or like controlled indoor and outdoor areas. For example, one type of mobile data capture device can be a handheld, radio frequency (RF) identification (RFID) tag reader for reading RFID tags associated with products located in the venue. Another type of mobile data capture device can be a handheld, bar code symbol reader, either moving laser beam-based or imager-based, for electro-optically reading bar code symbols associated with the products. Still another type of mobile data capture device can be a handheld terminal or computer, such as a smartphone with an onboard camera for capturing images of various targets, such as bar code symbols, products, or operators. In operation, such electronic mobile devices are electrically powered by an onboard battery, and are operated to perform their data capture functions, typically while being held in one of the operator's hands.

Although such mobile devices are generally satisfactory for their intended purposes, the operators may, from time to time, lay their mobile devices down on a nearby support surface to take a break, or to free their hands to perform tasks other than data capture, such as retrieving products from storage, or attending to some paperwork, etc., and thereafter, may forget to pick their mobile devices up to resume their operation, or forget where they laid the mobile devices down. Time and labor must be expended to hunt down these missing mobile devices. Sometimes, these missing mobile devices are never found and are deemed lost. Such lost mobile devices are costly to replace, and are unavailable to perform their intended functions.

Accordingly, it would be desirable to readily find and recover such lost mobile devices so that they need not be replaced and can be readily put back into service, with minimal service disruption.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for finding and recovering an electrically-powered, mobile device that is missing and presumed to be lost in a venue. The mobile device can be any handheld data capture reader, smartphone, tablet, computer, smartwatch, or like electronic device. The venue can be any environment, such as a retail store, a factory, a warehouse, a distribution center, a building, or a like indoor or outdoor controlled area. The arrangement includes a sensing system for generating sensing signals, each indicative of motion and/or location of the mobile device in the venue. A control system is operatively connected to the sensing system for executing a recovery action indicative of at least one location of the mobile device in response to at least one of the sensing signals. An interface is operatively connected to the control system for indicating the at least one location of the mobile device.

In one embodiment, the sensing system may include a motion sensor, such as an accelerometer, supported by the mobile device and operative to determine when the mobile device is in motion, and when the mobile device is at rest. In another embodiment, the sensing system may include a locationing system deployed in the venue and also operative to determine when the mobile device is in motion, and when the mobile device is at rest. The locationing system may advantageously be an ultrasonic locationing system having a plurality of ultrasonic transmitters mounted in the venue remotely from the mobile device for transmitting a plurality of ultrasonic ranging signals, and an ultrasonic receiver supported by the mobile device for receiving the ultrasonic ranging signals, in which case, the control system determines that the mobile device is in motion when the received ultrasonic ranging signals are different, and that the mobile device is at rest when the received ultrasonic ranging signals are substantially the same. The locationing system may also advantageously be a video system having a venue camera mounted in the venue remotely from the mobile device for capturing images of the mobile device, in which case, the control system determines that the mobile device is in motion when the captured images are different, and that the mobile device is at rest when the captured images are substantially the same.

In one embodiment, the control system executes the recovery action by energizing a device camera on the mobile device to capture an image indicative of the at least one location of the mobile device when the at least one sensing signal indicates that the mobile device is at rest. In another embodiment, the control system executes the recovery action by energizing the device camera to capture a plurality of images indicative of a plurality of locations of the mobile device, in which case, a last one of the images is indicative of the at least one location of the mobile device when the at least one sensing signal indicates that the mobile device is at rest. In still another embodiment, the control system executes the recovery action by energizing a radio frequency (RF) identification (RFID) tag locationing system deployed in the venue for reading RFID tags associated with products located at product locations in the venue, and for finding the product locations in the vicinity of the at least one location of the mobile device when the at least one sensing signal indicates that the mobile device is at rest. In an additional embodiment, a plurality of access points is deployed in the venue, and the control system executes the recovery action by sending an identification signal of an access point to which the mobile device was connected at the at least one location of the mobile device when the at least one sensing signal indicates that the mobile device is at rest. Advantageously, a database is operatively connected to the control system for storing the at least one location of the mobile device. The interface is operative for accessing the database, for displaying the stored at least one location of the mobile device, and/or for causing a sound to be emitted from the mobile device.

Another aspect of this disclosure relates to a method of finding and recovering an electrically-powered, mobile device that is missing in a venue. The method is performed by generating sensing signals each indicative of at least one of motion and location of the mobile device in the venue, by executing a recovery action indicative of at least one location of the mobile device in response to at least one of the sensing signals, and by indicating the at least one location of the mobile device at an interface.

In accordance with this disclosure, at least one location, and preferably the last known location, of the mobile device can be readily found by consulting the interface, preferably a web page. A retail store manager, the operator, or a like person, can access the database via the interface, which is preferably a display screen. The mobile device need not be replaced and can readily be put back into service, with minimal service disruption.

Figure 1:
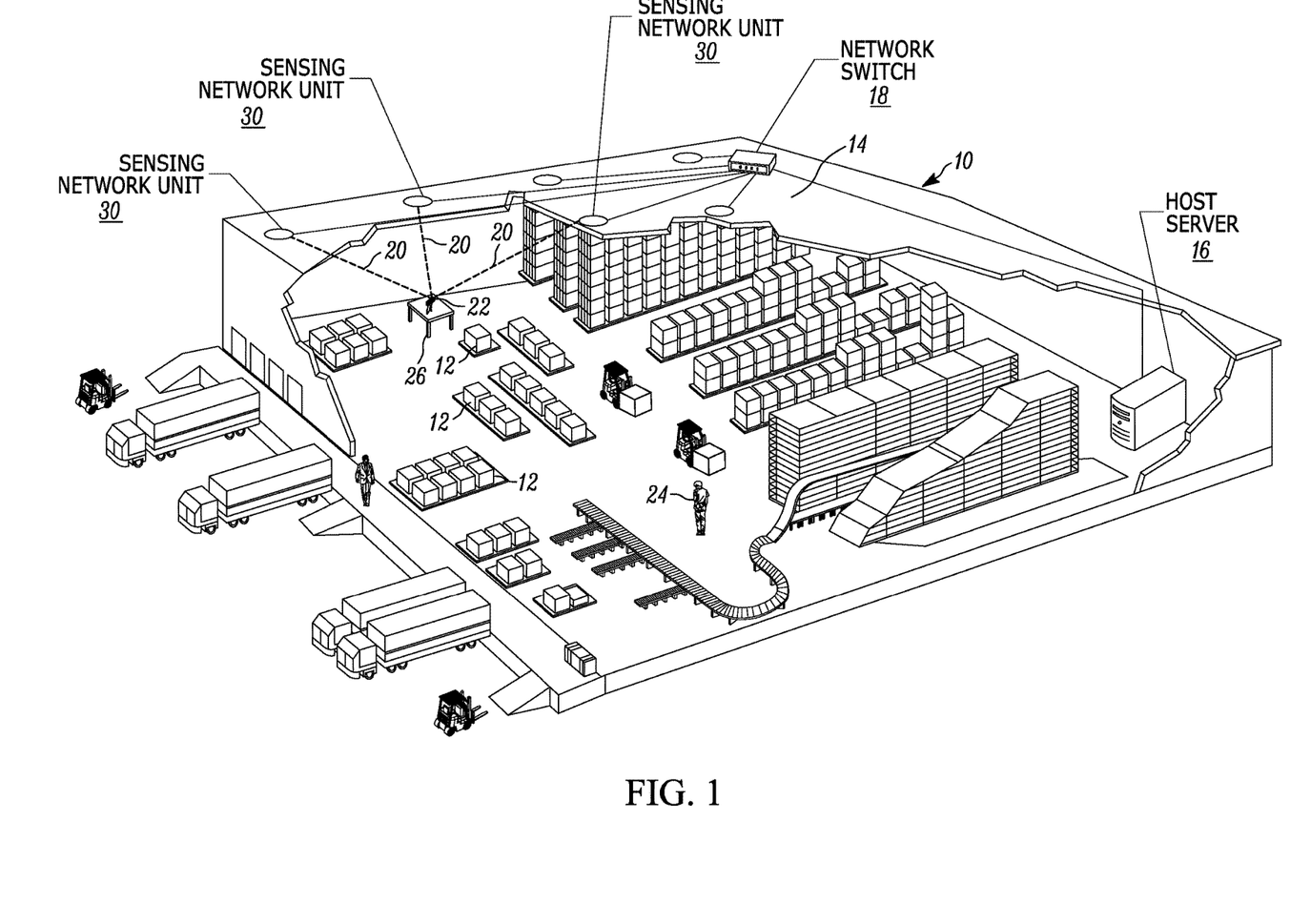
FIG. 1 is a broken-away, perspective view, as seen from above, of an arrangement for finding and recovering a mobile data capture device that is missing in a venue, such as a warehouse, in which multiple, overhead, sensing network units are deployed.
Figure 2:
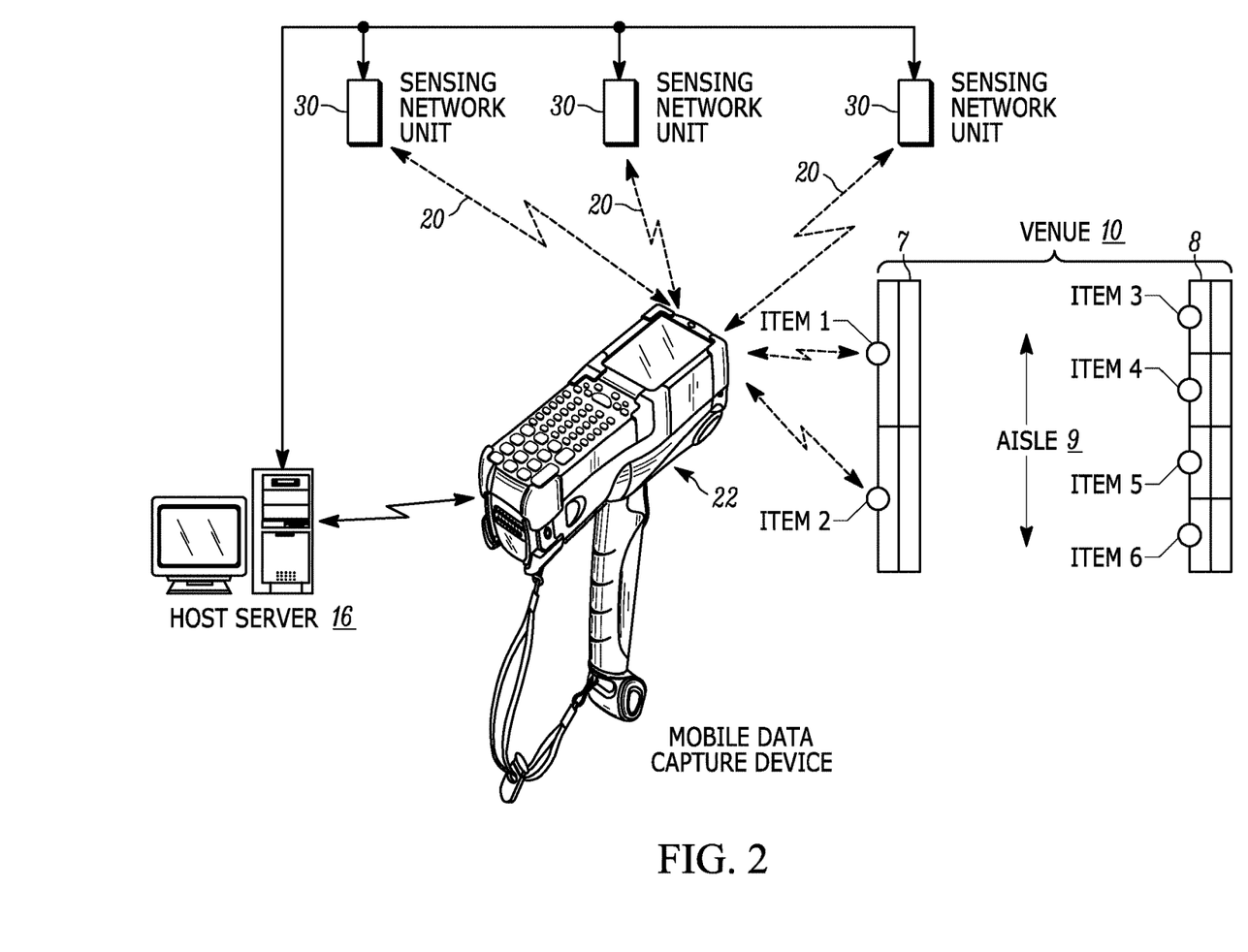
FIG. 2 is a simplified, pictorial diagram of the arrangement of the general type shown in FIG. 1.

Turning now to the drawings, reference numeral 10 in FIG. 1 generally depicts a venue in which a missing and presumed lost mobile device 22, shown more clearly in FIG. 2 as a handheld, data capture device 22, is to be found and retrieved in accordance with this disclosure. The venue 10 is shown as a warehouse in FIG. 1, but can be any environment, such as a retail store, a factory, a distribution center, a building, or a like indoor or outdoor controlled area. In use, the mobile device 22 is held or worn by, is operated by, and is jointly movable with, an operator 24, e.g., any person, employee, user, or associate authorized to operate the mobile reader 22. As shown in FIG. 2, the mobile device 22 is configured as a handheld, data capture reader, which is operated to capture data from products 12, shown in FIG. 1 as cuboid cartons for simplicity. The mobile data capture reader 22 may be configured as a radio frequency (RF) identification (RFID) tag reader for reading RFID tags associated with, or attached to, the products 12, or as a bar code symbol reader for reading bar code symbols associated with, or attached to, the products 12. The mobile device 22 can also be any smartphone, tablet, computer, terminal, smartwatch, or like portable electronic device, especially with an onboard device camera for capturing images of various targets, such as bar code symbols, products 12, or operators 24. In operation, such electronic mobile devices 10 are electrically powered by an onboard battery 44 (see FIG. 4), and are operated to perform their various functions, such as data capture, typically while being held in one of the operator's hands.

As described below, a plurality of sensing network units 30 is mounted overhead, for example, on or below a ceiling 14. Advantageously, the sensing network units 30 can be installed and spaced apart every twenty to eighty feet or so in a grid in the venue 10. As depicted in FIGS. 1-2, three of the sensing network units 30 can be used, as described below, to locate the mobile device 22, by triangulation or trilateration, as diagrammatically shown by dashed lines 20. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 controls each sensing network unit 30.

As best seen in FIG. 2, when the mobile reader 22 is an RFID tag reader, each product 12 is preferably tagged with an RFID product tag, preferably a passive RFID tag for cost reasons, and, in some applications, each RFID product tag may be associated with a pallet or a container for multiple products 12. The venue 10 may have any layout or configuration. As also shown in FIG. 2, the venue 10 may have, for example, a plurality of shelving structures 7 and 8 separated by an aisle 9 in the venue 10, and a plurality of RFID-tagged items 1-2 can be mounted on the shelving structure 7, and a plurality of other RFID-tagged items 3-6 can be mounted on the shelving structure 8.

Figure 3:
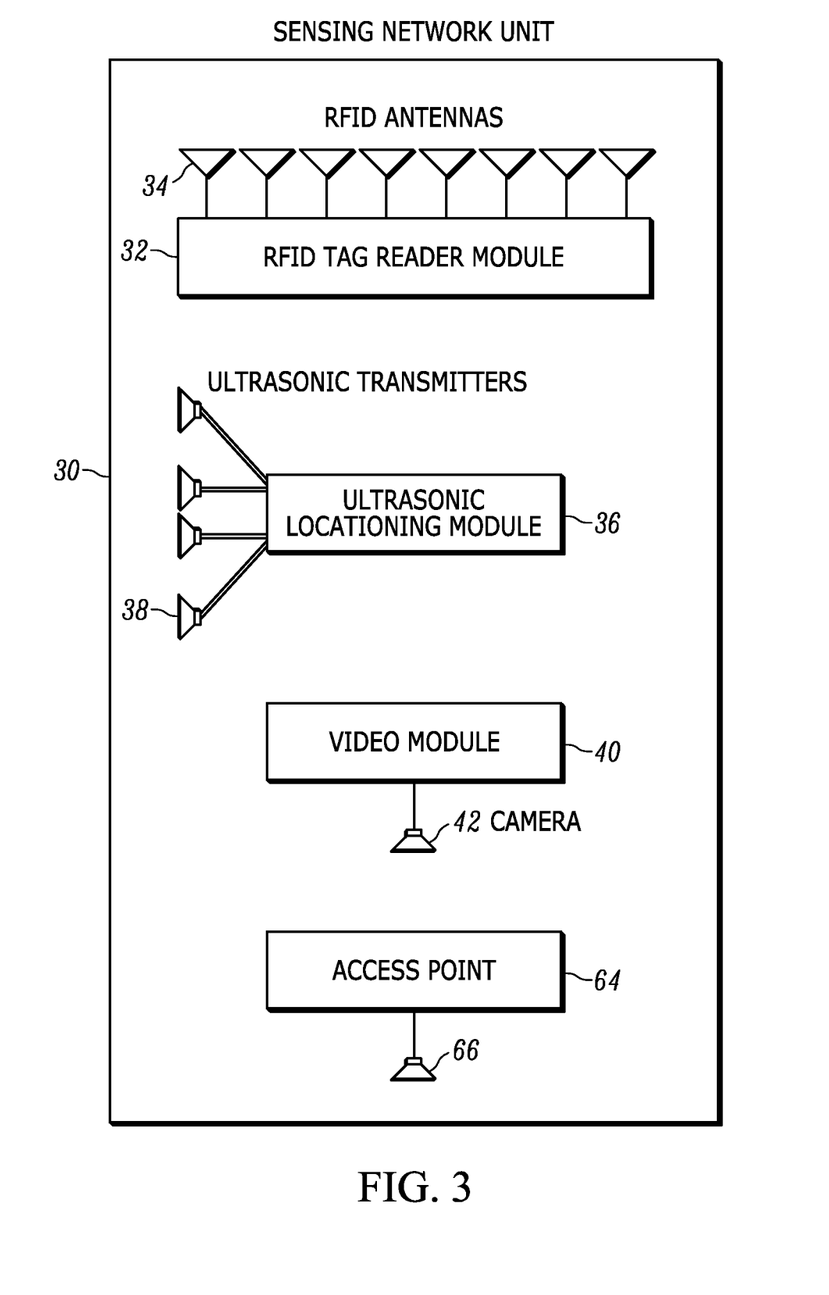
FIG. 3 is a simplified block diagram of various sensing systems that may be mounted in each sensing network unit of FIG. 1.

The block diagram of FIG. 3 depicts different systems that can be mounted in each sensing network unit 30. One or more sensing systems in each sensing network unit 30 can be operated to locate the mobile reader 22 and/or the products 12, and can also be operated, as described below, to determine whether the mobile reader 22 is in motion or is at rest in the venue. For example, one sensing system is an RFID locationing system, which includes an RFID tag reader module 32 having control and processing electronics and an RF transceiver operatively connected to a plurality of RFID antennas 34. The RFID module 32 transmits an RF interrogation signal to the RFID antennas 34, which radiate an antenna field pattern in a read zone in which the mobile device 22 is located. A locationing receiver 46 (see FIG. 4) on the mobile device 22 receives and responds to the interrogation signal. Multiple sensing network units 30 locate the locationing receiver 46 and, in turn, the mobile device 22. One or more of the RFID-tagged items 1-6 are also contained in the read zone, thereby also interrogating the payloads of the RFID-tagged items 1-6. The RFID-tagged items 1-6 return an RF response signal to the RFID module 32 via the RFID antennas 34. Each payload or captured target data from an RFID-tagged item identifies the RFID-tagged item, and multiple sensing network units 30 locate the RFID-tagged item.

Another sensing system is an ultrasonic locationing system operative for locating the mobile device 22. For example, the ultrasonic locationing system includes an ultrasonic locationing module 36 having control and processing electronics operatively connected to a plurality of ultrasonic transmitters, such as voice coil or piezoelectric speakers 38, for transmitting ultrasonic energy to an ultrasonic receiver or microphone 48 (see FIG. 4) on the mobile device 22. The receipt of the ultrasonic energy at the microphone 48 locates the mobile device 22. Each ultrasonic speaker 38 periodically transmits ultrasonic ranging signals, preferably in short bursts or ultrasonic pulses, which are received by the microphone 48. The microphone 48 determines when the ultrasonic ranging signals are received. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone 48 on the mobile device 22, using a suitable locationing technique, such as triangulation, trilateration, multilateration, etc.

Still another sensing system is a video locationing system operative for locating the mobile device 22, and/or the operator 24 operating the mobile device 22, and/or the product 12. The video locationing system includes a video module 40 having camera control and processing electronics that is connected to a venue camera 42 for capturing an image of the mobile device 22, and/or the operator 24, and/or the product 12. The venue camera 42 is advantageously a high-bandwidth, moving picture expert group (MPEG) compression camera. The capture of the image at the venue camera 42 is processed by the server 16 to locate the mobile device 22, and/or the user 24, and/or the product 12.

It will be understood that each sensing network unit 30 need not have all or some of the above-described locationing systems, and may include additional locationing systems, such as Wi-Fi or Bluetooth® locationing systems. In some embodiments, only one locationing system would suffice. In other embodiments, two or more of the locationing systems can cooperate with each other. In a preferred embodiment, the RFID locationing system is employed to sense the general location of the mobile device 22, and the ultrasonic locationing system and/or the video locationing system is employed to more accurately locate the mobile device 22. In addition, each sensing network unit 30 may have an access point 64 that can transmit and receive Wi-Fi communications signals via a Wi-Fi antenna 66 to an RF receiver, such as the receiver 46, on the mobile device 22. The access points are all interconnected in a wireless local area network (WLAN).

Figure 4:
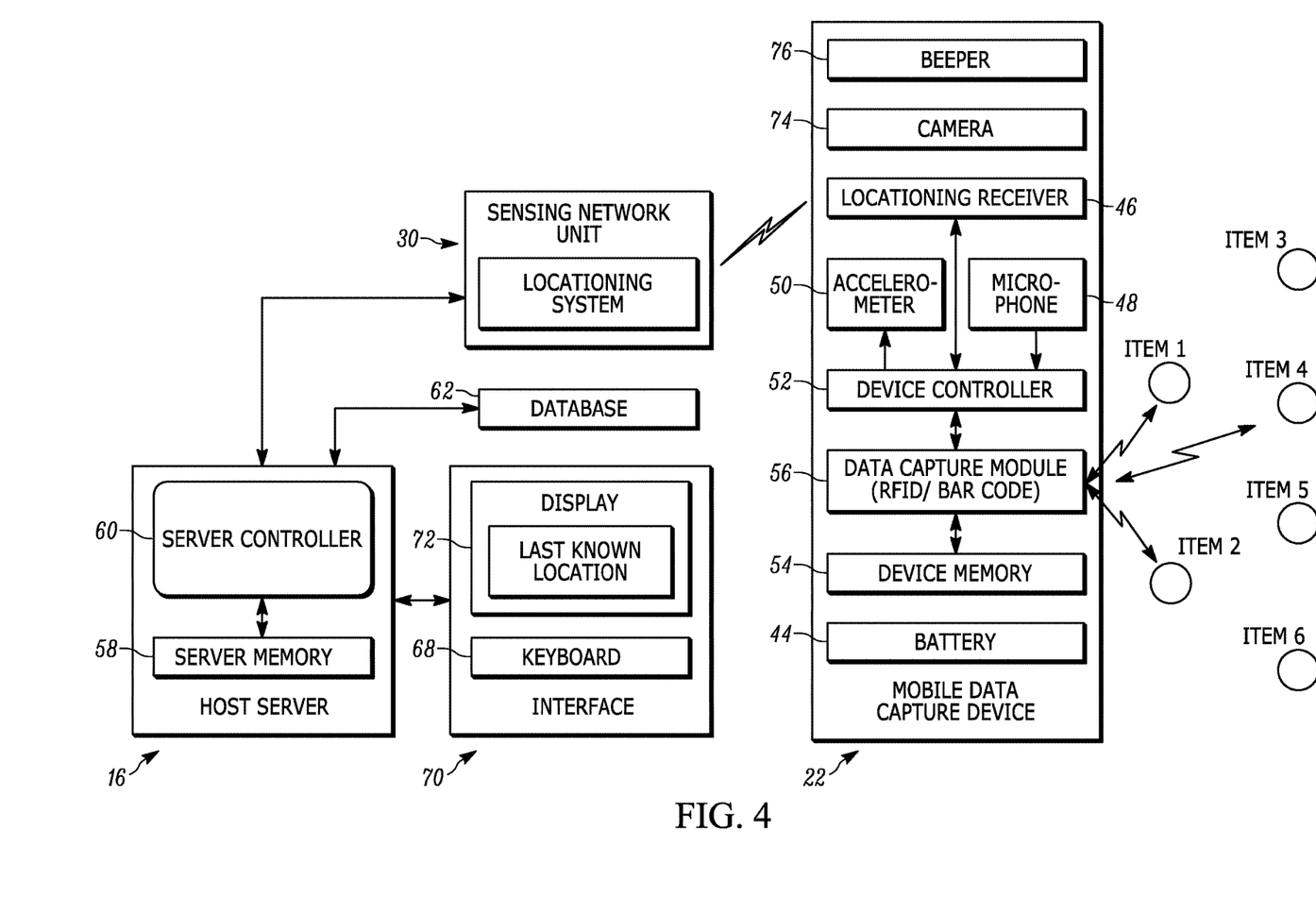
FIG. 4 is a simplified block diagram of the arrangement of FIG. 1.

As further shown in FIG. 4, the mobile device 22 has a data capture module 56, e.g., an RFID reader or a bar code reader, a programmed microprocessor or device controller 34 that controls all the electrical components in the mobile device 22, and a device memory 54 for storing data under the control of the device controller 52. The host server 16 also includes a programmed microprocessor or server controller 60 that controls all the electrical components in the arrangement, a server memory 58 for storing data in a database 62 under the control of the server controller 60, and a human accessible interface 70 that includes a keyboard 68 and a display or monitor screen 72.

As previously mentioned, the operator 24 may, from time to time, lay the mobile device 22 down on a nearby or convenient support surface, such as a table 26 (see FIG. 1), to take a break, or to free his/her hands to perform tasks other than data capture, such as retrieving products 12 from storage, or attending to some paperwork, etc., and thereafter, may forget to pick the mobile device 22 up from the table 26 to resume its operation, or forget where he/she laid the mobile device 22 down. One aspect of this disclosure is addressed to finding and recovering the missing and presumed to be lost mobile device 22 so that it need not be replaced, and to readily returning the mobile device 22 back to service, with minimal service disruption.

In accordance with this disclosure, an arrangement is provided for finding and recovering the mobile device 22, whether it is lost either in an indoor venue or in an outdoor venue. The arrangement includes a sensing system for generating sensing signals that are indicative of whether the mobile device 22 is in motion or at rest in the venue 10, and a control system, e.g., the device controller 52 and/or the server controller 60, that is operatively connected to the sensing system for executing a recovery action indicative of at least one location of the mobile device 22 in response to at least one of the sensing signals. As described below, the interface 70 is operatively connected to the host server 16 for indicating the at least one location of the mobile device 22.

More particularly, the sensing system may include a motion sensor, such as an accelerometer 50 (see FIG. 4), which is supported by the mobile device 22, and which is operative to determine if the mobile device is in motion or at rest. Preferably, the accelerometer 50 can detect motion of the mobile device 22 along any one or more of three mutually orthogonal axes, and is connected to the device controller 52 onboard the mobile device 22. The device controller 52 and/or the server controller 60, which together comprise the control system, analyze output sensing signals received from the accelerometer 50 and determine that the mobile device 22 is at rest when these signals are substantially the same. Otherwise, if the output sensing signals received from the accelerometer 50 are different, then the mobile device 22 is in motion.

The sensing system may include one or more of the aforementioned locationing systems that are deployed in the venue 10. For example, the device controller 52 and/or the server controller 60 analyze the ultrasonic ranging signals received from the microphone 48 and determine that the mobile device 22 is at rest when these received ultrasonic ranging signals are substantially the same. Otherwise, if the received ultrasonic ranging signals are different, then the mobile device 22 is in motion. As another example, the device controller 52 and/or the server controller 60 analyze the images captured by the venue camera 42 and determine that the mobile device 22 is at rest when these captured images are substantially the same. Otherwise, if these captured images are different, then the mobile device 22 is in motion. As yet another example, the device controller 52 and/or the server controller 60 analyze location signals received from the locationing receiver 46 and determine that the mobile device 22 is at rest when these received location signals are substantially the same. Otherwise, if these location signals are different, then the mobile device 22 is in motion.

Figure 5:
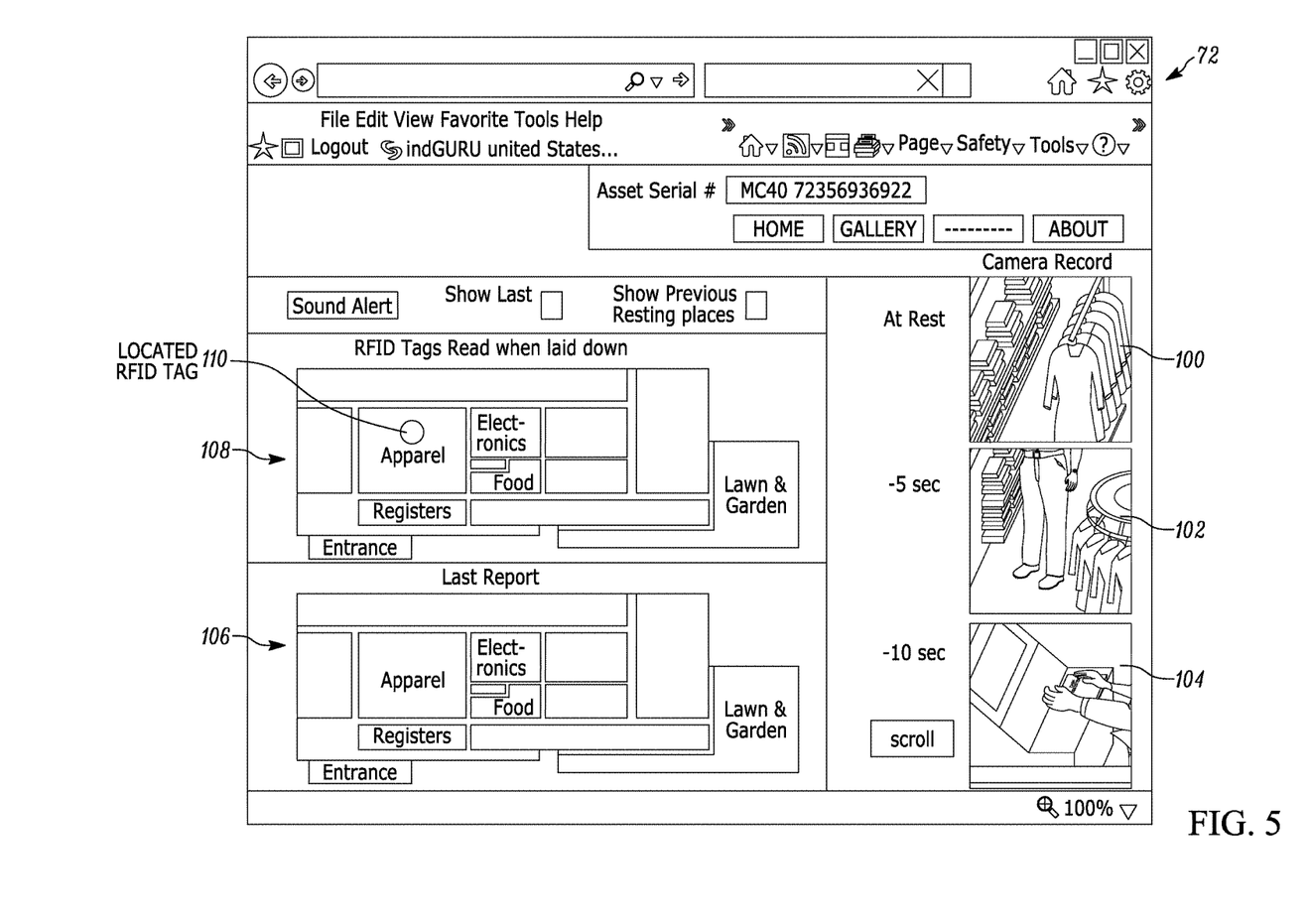
FIG. 5 is an exemplary interface or web page for displaying at least one location of the missing mobile device.

As previously mentioned, the control system executes one or more recovery actions each indicative of at least one location of the mobile device 22. For example, a device camera 74 (see FIG. 4) may be provided on the mobile device 22, and the control system executes the recovery action by energizing the device camera 74 to capture an image of the at least one location of the mobile device 22 when the mobile device 22 is at rest, and to send that captured image to the host server 16 for storage in the database 62 and/or for display on the display 72. The device camera 74 can also be operated to capture a succession of images when the mobile device 22 is in motion and to capture a last image when the mobile device 22 is at rest. Thus, as shown on the web page display 72 of FIG. 5, image 100 was taken when the mobile device 22 stopped moving and depicts, for example, a rack of hanging clothes; image 102 was taken five seconds earlier than image 100 and depicts, for example, a user's legs adjacent the rack of hanging clothes; and image 102 was taken five seconds earlier than image 102 and depicts, for example, a cash register at the venue, and so on. These time-sequenced images 100, 102, 104 depict a route taken by the mobile device 22.

As another example, the control system may execute a recovery action by energizing the RFID locationing system when the mobile device 22 stops moving. The RFID locationing system will read any RFID tags that are in the vicinity of the last known location of the lost mobile device 22. The RFID locationing system has a map of all product areas in the venue 10. By reading the RFID tags when the mobile device 22 stopped moving, the locations of the RFID tags in at least one of the mapped product areas will become known, and the location of the mapped product area is an indicator of the last known location of the lost mobile device 22. The control system will send the locations of the RFID tags to the host server 16 for storage in the database 62 and/or for display on the display 72. For example, if all the RFID tags that are read are associated with apparel or clothing products, then the lost mobile device 22 is probably in an apparel product area of the venue 10. Thus, as shown on the web page display 72 of FIG. 5, a map of all product areas in the venue 10 is shown at displayed image 106, and the same map with an indicator 110 that the lost mobile device is in the apparel area is shown in displayed image 108.

As another example, the control system may execute a recovery action by sending an identification signal of the access point 64 to which the lost mobile device 22 was connected at the last known location of the lost mobile device 22. The identification signal can advantageously be a media access control (MAC) address of the access point 64. The control system will send the MAC address to the host server 16 for storage in the database 62 and/or for display on the display 72. The MAC address is an indicator of the location of the connected access point 64 and, in turn, of the last known location of the mobile device 22.

The interface 70 can access the server memory 58 and/or the database 62 to retrieve the last known location of the mobile device 22. This retrieval is immediate and, therefore, the last known location of the mobile device 22 is immediately available to any human operator that views and operates the interface 70. Preferably, the control system will keep a historical log of all past locations of the mobile device, since some employees may habitually lose their mobile devices 22 in the same location. The control system may also keep a running log of several known locations of a mobile device in case the last known location is not ideal. The interface 70 can display the last known location of the mobile device 22 even when the battery 44 fails. The keyboard 68 can also be operated to cause an audible sound to be emitted from a beeper 76 (see FIG. 4) or analogous annunciator to help locate the mobile device 22.

Figure 6:
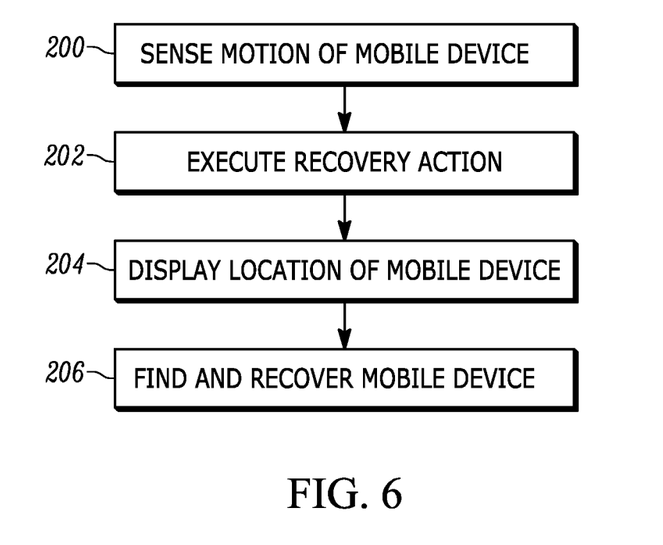
FIG. 6 is a flow chart depicting steps performed in accordance with the method of the present disclosure.

As shown in the flow chart of FIG. 6, in step 200, sensing signals indicative of whether the mobile device 22 is in motion or at rest in the venue 10 are generated by the accelerometer 50, or by any one or more of the locationing systems in the sensing network unit 30. The control system executes one or more of the above-described recovery actions indicative of at least one location of the mobile device 22 in step 202 in response to at least one of the sensing signals. In step 204, the control system causes the at least one location of the mobile device 22 to be displayed on the web page display 72 of the interface 70. In step 206, the display 72 is viewed in order to find and recover the mobile device 22.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for finding and recovering a misplaced mobile device in a venue, the arrangement comprising:
   a plurality of sensing units distributed throughout the venue;
   a sensing system for generating sensing signals each indicative of at least one of motion and location of the misplaced mobile device in the venue, at least some portion of the sensing system being a part of the misplaced mobile device, the at least some portion of the sensing system being in communication with at least one of the plurality of sensing units;
   a control system operatively connected to the sensing system for executing a recovery action indicative of at least one location of the misplaced mobile device in response to at least one of the sensing signals;
   an interface operatively connected to the control system for indicating the at least one location of the misplaced mobile device; and
   a device camera on the misplaced mobile device, and wherein the control system executes the recovery action by energizing the device camera to capture an image indicative of the at least one location of the misplaced mobile device when the at least one sensing signal indicates that the misplaced mobile device is at rest.

2. The arrangement of claim 1, wherein the sensing system includes at least one of a motion sensor supported by the misplaced mobile device, and a locationing system deployed in the venue.

3. The arrangement of claim 1, wherein the control system further executes the recovery action by energizing the device camera to capture a plurality of images indicative of a plurality of locations of the misplaced mobile device.

4. The arrangement of claim 1, further comprising a database operatively connected to the control system for storing the at least one location of the misplaced mobile device, and wherein the interface is operative for accessing the database and for displaying the stored at least one location of the misplaced mobile device.

5. The arrangement of claim 4, wherein the control system generates and stores in the database historical data indicative of past locations of the misplaced mobile device.

6. The arrangement of claim 1, wherein the interface is operative for indicating the at least one location of the misplaced mobile device by emitting a sound from the misplaced mobile device.

7. The arrangement of claim 1, wherein the control system is operative for executing the recovery action in at least one of an indoor venue and an outdoor venue.

8. A method of finding and recovering a misplaced mobile device in a venue, the method comprising:
   distributing a plurality of sensing units throughout the venue;
   generating, at least partially by the misplaced mobile device, sensing signals each indicative of at least one of motion and location of the misplaced mobile device in the venue, the sensing signals being communicated to at least one of the plurality of sensing units;
   executing a recovery action indicative of at least one location of the misplaced mobile device in response to at least one of the sensing signals; and
   indicating the at least one location of the misplaced mobile device at an interface,
   wherein the executing of the recovery action is performed by energizing a device camera on the misplaced mobile device to capture an image indicative of the at least one location of the misplaced mobile device when the at least one sensing signal indicates that the misplaced mobile device is at rest.

9. The method of claim 8, wherein the generating of the sensing signals is performed by at least one of a motion sensor on the misplaced mobile device, and a locationing system deployed in the venue.

10. The method of claim 8, wherein the executing of the recovery action is further performed by energizing a device camera on the misplaced mobile device to capture a plurality of images indicative of a plurality of locations of the misplaced mobile device.

11. The method of claim 8, further comprising storing the at least one location of the misplaced mobile device in a database, accessing the database, and displaying the stored at least one location of the misplaced mobile device at the interface.

12. The method of claim 11, further comprising generating and storing in the database historical data indicative of past locations of the misplaced mobile device.

13. The method of claim 8, wherein the indicating of the at least one location of the misplaced mobile device is performed by emitting a sound from the misplaced mobile device.

14. The method of claim 8, wherein the executing of the recovery action is performed in at least one of an indoor venue and an outdoor venue.

15. An arrangement for finding and recovering a misplaced mobile device in a venue, the arrangement comprising:
a plurality of sensing units distributed throughout the venue;
a sensing system for generating sensing signals each indicative of at least one of motion and location of the misplaced mobile device in the venue, at least some portion of the sensing system being a part of the misplaced mobile device, the at least some portion of the sensing system being in communication with at least one of the plurality of sensing units;
a control system operatively connected to the sensing system for executing a recovery action indicative of at least one location of the misplaced mobile device in response to at least one of the sensing signals;
an interface operatively connected to the control system for indicating the at least one location of the misplaced mobile device; and
a radio frequency (RF) identification (RFID) tag locationing system deployed in the venue for capturing data from RFID tags associated with products located at product locations in the venue, and wherein the control system executes the recovery action by energizing the RFID locationing system to read the RFID tags, and to find the product locations, in the vicinity of the at least one location of the misplaced mobile device when the at least one sensing signal indicates that the misplaced mobile device is at rest.

16. An arrangement for finding and recovering a misplaced mobile device in a venue, the arrangement comprising:
a plurality of sensing units distributed throughout the venue;
a sensing system for generating sensing signals each indicative of at least one of motion and location of the misplaced mobile device in the venue, at least some portion of the sensing system being a part of the misplaced mobile device, the at least some portion of the sensing system being in communication with at least one of the plurality of sensing units;
a control system operatively connected to the sensing system for executing a recovery action indicative of at least one location of the misplaced mobile device in response to at least one of the sensing signals;
an interface operatively connected to the control system for indicating the at least one location of the misplaced mobile device; and
a plurality of access points deployed in the venue, wherein the control system executes the recovery action by sending an identification signal of an access point to which the misplaced mobile device was connected at the at least one location of the misplaced mobile device when the at least one sensing signal indicates that the misplaced mobile device is at rest.

17. A method of finding and recovering a misplaced mobile device in a venue, the method comprising:
distributing a plurality of sensing units throughout the venue;
generating, at least partially by the misplaced mobile device, sensing signals each indicative of at least one of motion and location of the misplaced mobile device in the venue, the sensing signals being communicated to at least one of the plurality of sensing units;
executing a recovery action indicative of at least one location of the misplaced mobile device in response to at least one of the sensing signals; and
indicating the at least one location of the misplaced mobile device at an interface,
wherein the executing of the recovery action is performed by energizing a radio frequency (RF) identification (RFID) tag locationing system deployed in the venue for reading RFID tags associated with products located at product locations in the venue, and for finding the product locations in the vicinity of the at least one location of the misplaced mobile device when the at least one sensing signal indicates that the misplaced mobile device is at rest.

18. A method of finding and recovering a misplaced mobile device in a venue, the method comprising:
distributing a plurality of sensing units throughout the venue;
generating, at least partially by the misplaced mobile device, sensing signals each indicative of at least one of motion and location of the misplaced mobile device in the venue, the sensing signals being communicated to at least one of the plurality of sensing units;
executing a recovery action indicative of at least one location of the misplaced mobile device in response to at least one of the sensing signals;
indicating the at least one location of the misplaced mobile device at an interface; and
deploying a plurality of access points in the venue,
wherein the executing of the recovery action is performed by sending an identification signal of an access point to which the misplaced mobile device was connected at the at least one location of the misplaced mobile device when the at least one sensing signal indicates that the misplaced mobile device is at rest.

* * * * *